United States Patent [19]
Ellner

[11] 3,738,438
[45] June 12, 1973

[54] DIGITAL READOUT SCALE WITH ACTUATED POISE
[75] Inventor: Edwin Ellner, Oxford, Conn.
[73] Assignee: Better Packages, Inc., Shelton, Conn.
[22] Filed: June 28, 1972
[21] Appl. No.: 267,193

[52] U.S. Cl. .................................. 177/25, 177/215
[51] Int. Cl. ........................ G01g 23/22, G01g 7/00
[58] Field of Search ................ 177/1, 25, 213–215, 177/DIG. 6, 210

[56] References Cited
UNITED STATES PATENTS

| 2,633,349 | 3/1953 | Williams | 177/215 X |
| 2,741,472 | 4/1956 | Thayer et al. | 177/215 |
| 2,987,131 | 6/1961 | Borzer | 177/215 X |
| 3,061,026 | 10/1962 | Hecox et al. | 177/DIG. 6 |
| 3,123,164 | 3/1964 | Echenique et al. | 177/1 |
| 3,279,552 | 10/1966 | Southall | 177/213 |

Primary Examiner—George H. Miller, Jr.
Attorney—Curtis, Morris & Safford

[57] ABSTRACT

A digital readout postal scale of the platform balance type wherein the poise is moved along the balance beam by an internally threaded carriage on a lead screw extending parallel to the balance beam, the lead screw being driven by an electrical motor controlled by phototransistors which sense the position of the balance beam, energizing the motor to drive the poise in a fast forward mode when the beam is against an upper stop, in a fast reverse mode when the beam is against a lower stop and for a sufficient time after it moves up from the lower stop to allow it to pass the balance point between the two stops, and at other times in a slow forward mode, and wherein an ounce code disc bearing binary coded ounce holes is rotated by the lead screw one revolution for each pound of load, the ounce reading being made by phototransistors while the balance beam is still moving, this ounce reading being controlled by a phototransistor which senses when the balance beam reaches the balance point, this phototransistor also actuating a solenoid to stop the lead screw and controlling other phototransistors mounted on the carriage to sense binary coded pound and postage holes spaced, at intervals corresponding to one pound of load, lengthwise of pound and postage code members extending parallel to the lead screw. The postage code member may be in the form of a roll which is supported on rollers on a removable plate, the rollers being driven by an electrical motor controlled by phototransistors which sense binary coded rate group identifying holes in the roll to stop the motor when the group of rate code holes representing the postage rates for the desired combination of mode of shipment and distance zone, which has been selected by pushbutton switches, has reached the read position.

11 Claims, 7 Drawing Figures

DIGITAL READOUT SCALE WITH ACTUATED POISE

This invention relates to a digital readout platform balance scale as used, for example, for determining the postage required for parcel shipments.

It is among the objects of the invention to provide a platform balance scale having automatic balancing mechanism which gives a rapid readout, which does not depend on waiting for the balance beam to stop oscillating.

Another object is that of providing such a scale having provision for determination and digital display of the postage required for any of a number of modes of shipment to any of a number of distance zones.

Still another object is the provision of such a scale wherein the desired mode of shipment and the desired distance zone may be rapidly selected, and wherein provision is made for rapid adaptation of the scale to reflect changes in the postal rates or shipping charges.

A further object is that of providing such a scale which is relatively simple and inexpensive in construction yet accurate and foolproof in operation.

Other objects will be apparent from the ensuing description.

GENERAL ORGANIZATION

Figures 1, 2:
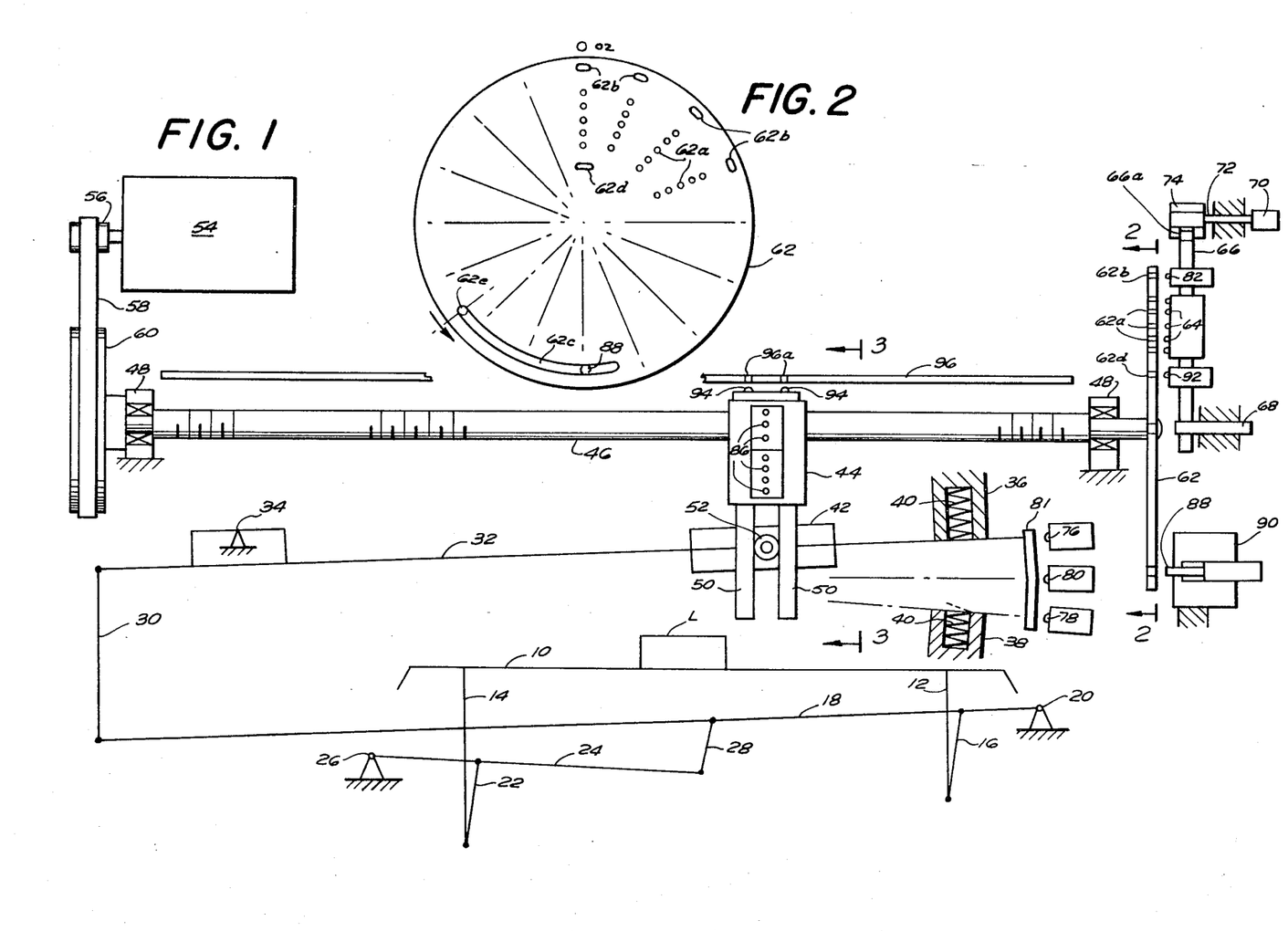
FIG. 1 is a somewhat diagrammatic side elevational view of the principal mechanical components of an illustrative scale embodying certain features of the invention.
FIGS. 2 and 3 are fragmentary vertical and transverse sectional views taken respectively on the lines 2—2 and 3—3 of FIG. 1.

The illustrative scale shown in FIG. 1 includes a platform 10 for supporting the load L to be weighed, the platform 10 being supported for vertical movement on vertical posts 12 and 14. The post 12 is pivotally attached to the lower end of a link 16 whose upper end is pivotally attached to a lever 18, one end of which is pivotally supported on a bearing 20. The post 14 is pivotally attached to the lower end of a link 22 whose upper end is pivotally attached to a lever 24, one end of which is pivotally supported on a bearing 26 and the other end of which is pivotally attached to the lower end of a link 28 whose upper end is pivotally attached to a lever 18. As will be understood, this arrangement keeps the platform 10 level while permitting its vertical movement and causing the lever 18 to rotate about the pivot 20 in proportion to such vertical movement.

The free end of the lever 18 is pivotally attached to the lower end of a link 30 whose upper end is pivotally attached to one end of a balance beam 32 which is pivoted on a bearing 34. Thus the balance beam rotates proportionally to the rotation of the lever 18, but through a larger angle due to the relative proximity of the point of attachment of the link 30 to the pivot 34 of the balance beam.

The pivotal movement of the balance beam 32 is limited by upper and lower stops 36 and 38 which are positioned above and below the beam near its free outer end. Each of these stops is provided with a generally vertical internal cylindrical bore in which is supported a helical compression spring 40 whose outer end projects slightly beyond the inner surface of the stop. The mechanical design parameters are preferably such that an imbalance of about one and one-half pounds on the high side of the balance point will bring the balance beam 32 into engagement with the upper spring 40, an imbalance of more than about four pounds will bring it against the upper stop 36, and an imbalance of about one and one-half pounds on the low side will bring it into engagement with the lower stop 38.

Slidably supported on the balance beam 32 for longitudinal movement thereon is a poise 42 which balances the force applied by the load L on the platform 10. The poise is moved along the balance beam 32 by a carriage 44 which includes an internally threaded nut (not shown) in threaded engagement with a lead screw 46 which extends generally parallel to the balance beam 32 with its end portions rotatably supported in bearings 48. Extending downwardly from opposite sides of the carriage 44 are pairs of spaced vertical arms 50 which straddle rollers 52 rotatably supported at opposite sides of the poise 42. Since the inner surfaces of the arms 50 extend generally perpendicularly to a radial line extending from the pivotal axis of the balance beam 32, the arms do not significantly impede the pivotal movements of the balance beam through the limited angle of rotation which is permitted by the stops 36 and 38.

The lead screw 46 is driven by an electrical motor 54 through a small pulley 56 keyed on the motor shaft, a belt 58 and a larger pulley 60 keyed on one end of the the lead screw.

OUNCES MEASUREMENT

Keyed on the opposite end of the lead screw 46 is an ounce code disc 62. The pitch of the lead screw 46, the ratio of the mechanical linkages and the weight of the poise are so related that for each revolution of the lead screw 46 and the ounce code disc 62, the poise 42 is moved along the balance beam a distance corresponding to one pound of weight of the load L.

As shown in FIG. 2, the ounce code disc 62 bears 16 binary digital codes, respectively representing zero through 15 ounces, in the form of holes 62a extending through the disc along radial lines angularly spaced at intervals of one-sixteenth of a revolution. In the embodiment shown, the "tens" digit and the "ones" digit are separately coded, which requires only one binary logic bit for the "tens" digit (which is either one or zero) and four bits for the "ones" digit (from zero through nine). Thus a total of up to five equally radially spaced holes 62a are provided for each of the 16 ounce numbers. While in FIG. 2 five holes 62a are shown at each of the radial positions, it will be understood that in the binary coding systems holes will actually be present at only about one-half of the indicated positions, depending on the numbers represented.

The ounce codes are read by a series of five photosensitive devices, such as phototransistors 64, which detect the light passing through the holes 62a. The phototransistors 64 are adjustably mounted on a radial arm 66 which is pivotally supported on a pin 68 for rotation by a calibration control knob 70 keyed at the outer end of a rotatable shaft 72 on the inner end of which is keyed a pinion 74 meshing with sector gear teeth 66a formed in the outer edge of the radial arm 66. This allows movement of the phototransistors 64 through a limited angle about the axis of the pin 68 to achieve proper calibration.

The ounces reading is made while the ounces code disc 62 is moving, when the next higher integral ounce indicia are reached after the balance beam 32 has passed the balance point intermediate the upper and lower stops 36 and 38. The position of the balance beam 32 is sensed by three photosensitive devices, such as phototransistors, including upper and lower phototransistors 76 and 78, and a balance phototransistor 80. An arcuate light shield 81 at the outer end of the balance beam cuts off light to the upper phototransistor 76 only when the balance beam is against the upper stop 36, cuts off light to the balance phototransistor 80 whenever the balance beam is above the balance point, and cuts off light to the lower phototransistor 78 except when the balance beam is against the lower stop 38.

Figure 6:
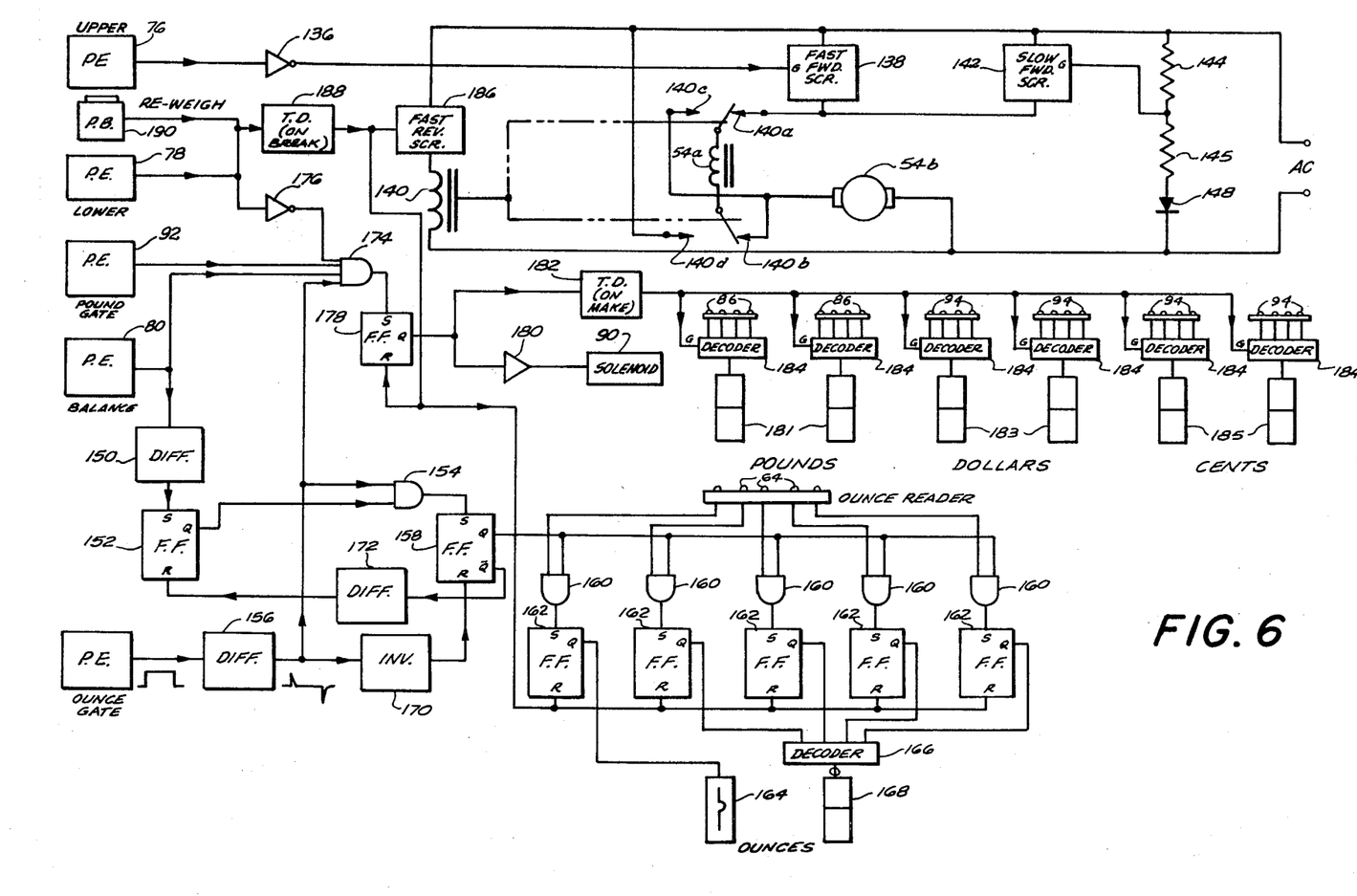
FIGS. 6 and 7 are logic diagrams, partly in schematic form and partly in block diagram form, FIG. 6 showing the electronic circuit which controls the poise drive motor and the code readers and decoders, and FIG. 7 showing the circuit which controls the motor which drives the rate code roll.

As will be explained more fully hereinafter in discussing the electronic control circuit of FIG. 6, the timing of the ounces reading is controlled by the balance phototransistor 80 and by an "ounce gate" phototransistor 82 which is mounted on the upper portion of the radial arm 66 and which cooperates with a series of ounce gate holes 62b which, as best shown in FIG. 2, are arranged in a concentric circle near the periphery of the ounces code disc 62, in respective alignment with the radial lines passing through the binary codes for the ounce numerals.

POUNDS MEASUREMENT

Figures 3, 4, 5:
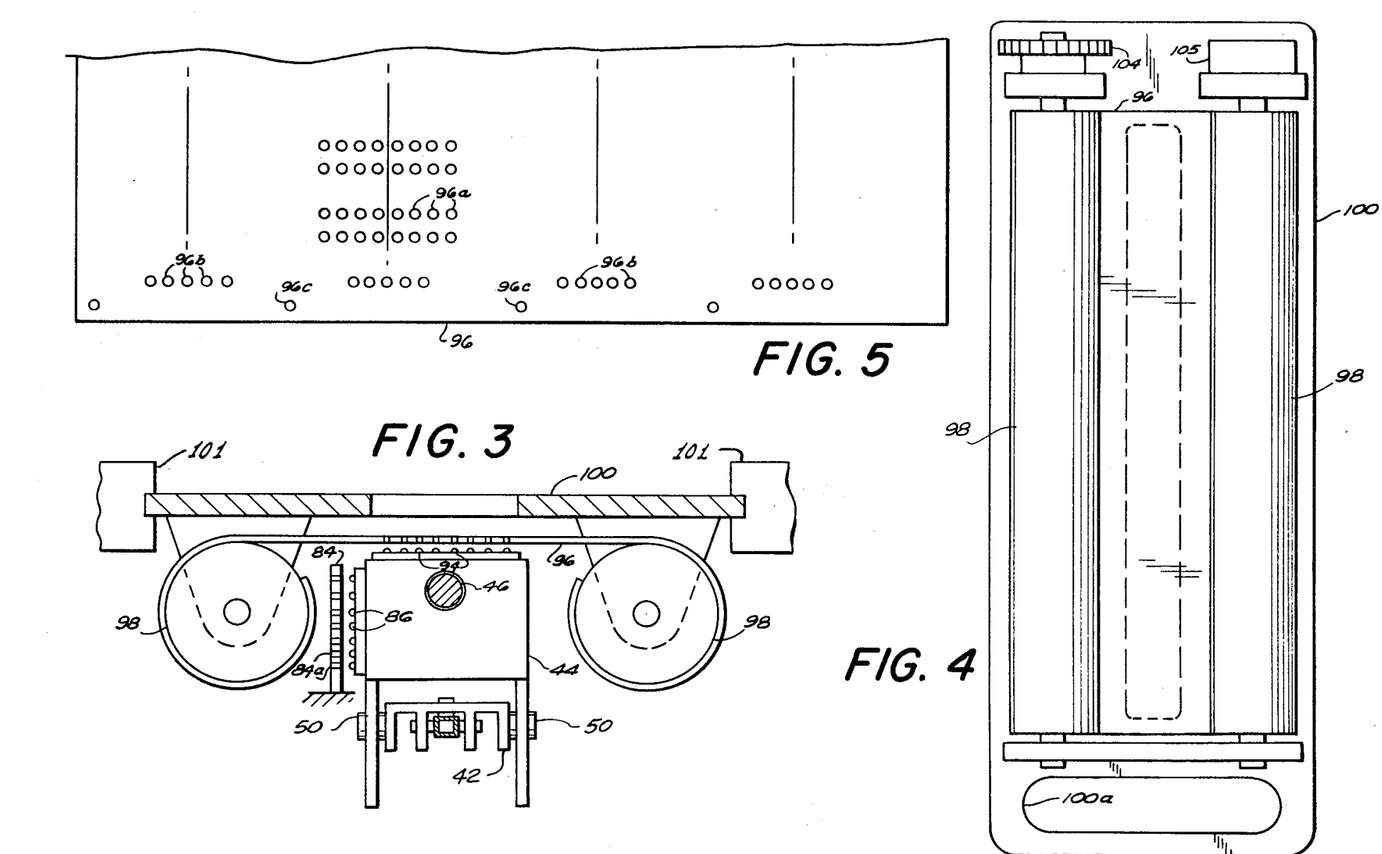
FIG. 4 is a bottom plan view of the removable rate code assembly shown in FIG. 3.
FIG. 5 is a fragmentary plan view of the rate code roll of the assembly shown in FIG. 4.

As shown in FIG. 3, mounted at one side of and parallel to the lead screw 46 is an elongated pound code plate 84 having spaced along it, at intervals corresponding to the distance of movement of the poise 42 and carriage 44 for each pound of weight of the load L, a series of binary coded indicia representing numbers of pounds from zero up to the capacity of the scale, for example 70 pounds. As will be understood, this requires a seven-bit binary code, and each of the indicia therefore consists of up to seven holes 84a extending through the plate 84 at spaced positions along a vertical line. These coded numerals are read by photoelectric means, such as a series of seven similarly vertically spaced phototransistors 86 supported at one side of the carriage 44.

The pounds reading is made after the movement of the lead screw 46 and carriage 44 are brought to a stop by engagement of a pin 88 in a slot 62c in the ounce code disc 62. The pin 88 is actuated by a solenoid 90 which, as will be explained hereinafter, is energized under the control of the balance phototransistor 80, the "ounce gate" phototransistor 82, and a "pound gate" phototransistor 92 which cooperates with a "pound gate" hole 62d at the inner portion of the ounce code disc 62 in alignment with the radial line coinciding with the position of the binary coded indicia for zero ounces. Thus the pin 88 is moved into the slot 62c when the "ounce gate" hole 62b and the "pound gate" hole 62d come into respective alignment with the phototransistors 82 and 92 after the balance beam 32 has reached the balance position. The slot 62c is elongated and curved in a circular arc concentric with the axis of rotation of the lead screw 46 and the disc 62 to allow for variation in the time of actuation of the pin 88 due to adjustment of the angular position of the radial arm 66 in calibrating the scale, as described above. However, regardless of what portion of the slot 62c is opposite the pin 88 when it is moved into the slot, rotation of the disc 62 and the lead screw 46 are stopped when the end 62e of the slot (FIG. 2) engages the pin 88. The orientation of the ounce code disc 62 relative to that of the lead screw 46 is such that this always occurs when the phototransistors 86 are in longitudinal alignment with one of the binary pound codes formed by the holes 84a.

POSTAGE INDICATION

Mounted on top of the carriage 44 is a group of sixteen phototransistors 94, arranged in two closely spaced transverse rows of eight phototransistors each, respectively cooperating with similarly arranged binary coded holes 96a in a postage code roll 96 which is supported above and parallel to the lead screw 46 with its opposite ends coiled on spaced parallel rollers 98 (FIGS. 3 and 4) rotatably mounted at opposite sides of a supporting plate 100. As shown in FIG. 3, the longitudinal edges of the supporting plate 100 are slidably received in slotted brackets 101 in the scale, to permit ready removal and replacement of the plate for convenient replacement of the postage code roll as necessitated by changes in the postage rates. As shown in FIG. 4, a slot 100a at one end of the supporting plate 100 serves as a hand grip.

As shown in FIG. 5, the postage codes are arranged on the roll 96 in a plurality of groups spaced longitudinally of the roll, each group representing the postage rates for a particular combination of distance zone and mode of shipment (for example, parcel post, book rate, priority mail and private carrier, such as United Parcel Service). To select the proper rate group, the roll 96 is moved lengthwise by rotation of the rollers 98.

Each rate group consists of a plurality of sets of four four-bit binary codes (respectively representing two dollar digits and two cents digits) reflecting the postage for various weights of shipment in the selected rate group, the center lines of these sets being spaced transversely of the roll 96 (longitudinally of the lead screw 46) at intervals corresponding to the distance of movement of the carriage 44 for each pound of weight of the load L.

POSTAGE RATE SELECTION

Figure 7:
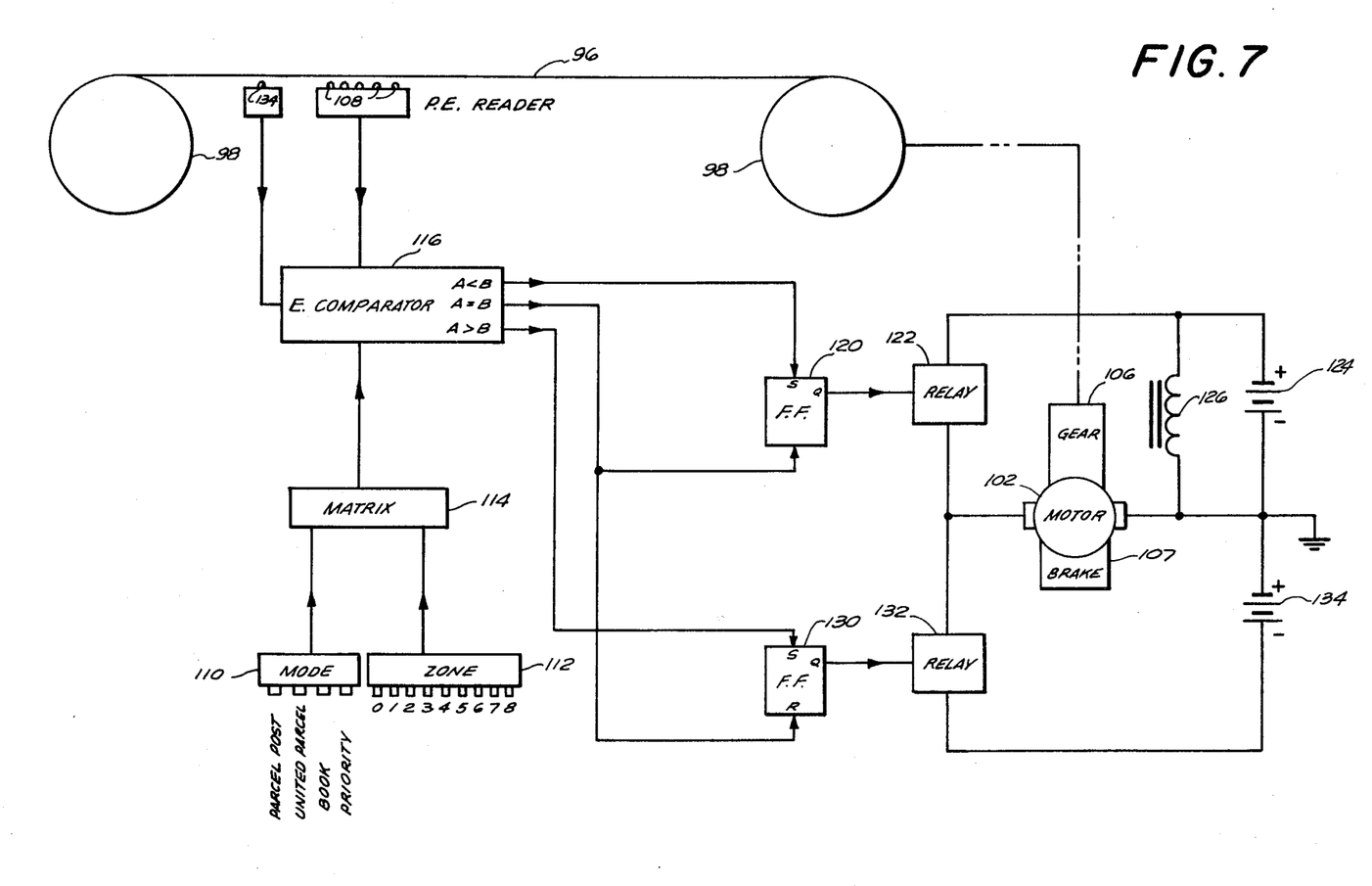

The rollers 98 are driven by a reversible electrical motor 102 (shown only in FIG. 7) which is coupled to one of the rollers through a spur gear 104 (FIG. 4) keyed on its outer end, and by a spiral return spring 105, one end of which is fixed to the outer end of the other roller 98 and the other end of which is fixed to the supporting plate 100. As shown in FIG. 7, the motor 102 has a worm gear speed reducer 106 and an electrically controlled brake 107 which is automatically engaged when the motor is stopped to hold the roll 96 in the position to which it is moved by the motor 102, against the force of the return spring 105 during the time the motor is not operating.

The motor 102 is controlled by group-identifying indicia in the form of binary coded holes 96b near one edge of the roll 96 in transverse alignment with the corresponding group of rate code holes 96a. On the illustrative rate code roll 96 shown, there are 32 rate groups, representing all the possible combinations of four modes of shipment and eight distance zones. Thus the identification of the rate groups requires a five-bit binary code, formed by up to five holes 96b for each of the group-identifying indicia.

The holes 96b cooperate with five photosensitive devices, such as phototransistors 108 (FIG. 7), positioned beneath the edge of the roll 96. To select the desired postage rate group, the operator pushes one of four interlatching pushbuttons 110 respectively representing the four modes of shipment and one of nine interlatching pushbuttons 112 respectively representing nine distance zones zero (or "local") through eight. These pushbuttons 110 and 112 select from a storage matrix 114 the binary code for the appropriate one of the rate groups, and a comparator 116 compares the coded number of this group with the coded number of the group then in the "read" position opposite the phototransistors 108 and determines whether the latter number is equal to, less than or greater than the number of the group selected. If it is less, a positive pulse is supplied to the "set" input S of a "forward drive" flip-flop 120 whose "Q" output energizes a relay 122 to supply current from an electrical source 124 to the armature of the motor 102, whose field winding 126 is also connected to the source 124, thereby energizing the motor and causing it to drive the roll 96 in the forward direction.

If the coded number of the rate group in the "read" position is higher than that of the group selected by the pushbuttons 110 and 112, another terminal of the comparator 116 sends a positive pulse to the "set" input S of a "reverse drive" flip-flop 130 whose "Q" output energizes a relay 132 to supply current from an electrical source 134 of opposite polarity to the armature of the motor 102 causing it to drive the roll 96 in the reverse direction.

When the roll 96 has moved to the point where the group identifying indicia of the selected rate group are in the "read" position opposite the phototransistors 108, another terminal of the comparator 116 sends a positive pulse to the "reset" inputs R of both flip-flops 120 and 130, opening whichever of the relays 122 and 132 is then closed, thereby stopping the motor 102.

To prevent sensing of the rate group identifying indicia when they are moving between the proper "read" positions, which would cause a false reading, a "read trigger" phototransistor 134 cooperating with spaced holes 96c (FIG. 5) enables the comparator 116 only when the holes 96b of each group are properly centered in the "read" position.

ELECTRONIC CONTROL CIRCUIT AND SEQUENCE OF OPERATION

The sequence of operation of the scale may now be described, with particular reference to FIGS. 1 and 6.

To determine the weight and correct postage for a parcel, the operator need only press the pushbuttons 110 and 112 for the desired mode of shipment and distance zone, and place the parcel on the platform 10. Assuming that the scale has previously been balanced in a "no load" condition, and assuming that the parcel weighs more than four pounds, the weight of the load will cause the balance beam to move up against the upper stop 36, deactivating the upper phototransistor 76. As may be seen in FIG. 6, the upper phototransistor 76 is connected to an inverter 136 which, upon deactivation of the phototransistor 76, sends a positive signal to the gate G of a "fast forward" silicon controlled rectifier 138, causing it to supply substantially the full voltage from an alternating current source through the normally closed contacts 140a and 140b of a relay 140 to the series-connected field winding 54a and armature 54b of the motor 54 (see also FIG. 1) which drives the lead screw 46. This causes the motor 54 to be driven at a fast forward speed to rotate the lead screw 46 and move the carriage 44 along it, pushing the poise 42 rapidly along the balance beam 32.

As the poise 42 approaches the point along the balance beam 32 at which it balances the weight of the load (for example, within approximately 4 pounds of the balance point), the balance beam will move downwardly away from the upper stop 36, activating the upper phototransistor 76 which, through the inverter 136, removes the positive signal from the gate G of the "fast forward" SCR 138 allowing it to return to cutoff condition.

When this happens, the only current reaching the field winding 54a and armature 54b of the motor 54 is that supplied by a "slow forward" silicon controlled rectifier circuit 142, whose gate G is connected to a resistive voltage divider 144, 145 in series with a rectifier 148 across the alternating current source. The characteristics of the SCR circuit 142 and the gate voltage are so related that the motor 54 is supplied current to drive the poise 42 at a slow rate as the balance point is approached, which is the normal mode of operation of the motor 54.

When the balance beam 32 reaches the balance point, the balance phototransistor 80 is activated. As shown in FIG. 6, this sends a positive signal to a differentiator 150, which forms a sharp positive pulse coinciding with the leading edge of the signal, and this pulse is sent to the "set" input S of a flip-flop 152, whose "Q" output enables one input of an AND gate 154. After the lead screw 46 (FIG. 1) and ounce code disc 62 have continued to rotate for whatever fraction of one-sixteenth of a revolution is necessary to bring the next ounce gate hole 62b into alignment with the phototransistor 82, as shown in FIG. 6, the activation of the phototransistor 82 during passage of the hole 62b sends a flat-top positive pulse to a differentiator 156 which forms a positive spike coinciding with the leading edge of the flat-top pulse and a negative spike coinciding with the trailing edge. The positive spike enables the other input of the AND gate 154.

The output of the AND gate 154 is connected to the "set" input S of an "ounce read" flip-flop 158, whose "Q" output enables one input of each of a series of AND gates 160 whose other inputs are enabled by the phototransistors 64 (see also FIG. 1) which sense the ounce code holes 62a. The outputs of the AND gates 160 are respectively connected to the "set" inputs S of a series of five flip-flops 162, the "Q" output of one of which is connected to a "tens" digit readout bulb 164 which is illuminated to display the numeral "1" for all ounce readings from 10 through 16, and which is blacked out for all readings from zero through nine. The "Q" outputs of the other four flip-flops 162 are connected to a decoder 166 which drives a seven-segment numerical display tube 168 which indicates the "ones" digit of the ounce reading.

The negative spike which coincides with the trailing edge of the flat-top pulse formed as the ounce gate hole 62b (FIG. 1) passes the phototransistor 82 is connected to the input of an inverter 170 (FIG. 6) which inverts it to a positive spike and feeds it to the reset input R of the "ounce read" flip-flop 158. This resets the flip-flop 158, removing the positive voltage from one of the inputs of each of the AND gates 160 and disconnecting the phototransistors 64 from the flip-flops 162. The "Q" output of the "ounce read" flip-flop 158 is connected to a differentiator 172, which sends a sharp positive spike coinciding with the trailing edge of the ounce gate pulse to the reset input R of the flip-flop 152, resetting it and removing the enabling signal from one leg of the AND gate 154. This disables the AND gate 154 and prevents the next pulse from the "ounce gate" phototransistor 82 from triggering the flip-flop 158. This locks the ounce readout to the aforementioned reading, and prevents changes in the reading as the ounce code disc 62 continues rotating.

As the ounce code disc 62 continues rotating within one revolution the "pound gate" hole 62d (FIG. 1) will come into alignment with the phototransistor 92. As may be seen in FIG. 6, the resulting activation of the phototransistor 92 enables one leg of a four-input AND gate 174, one other leg of which has already been enabled by activation of the balance phototransistor 80 and another leg of which is normally enabled by the output of an inverter 176. The fourth leg is enabled by the positive spike from the differentiator 156 coinciding with the leading edge of the pulse formed when the "ounce gate" hole 62b passes the phototransistor 82. Thus, when the ounce code disc 62 reaches the "zero ounce" position, the AND gate 174 is fully enabled, and sends a positive pulse to the "set" input S of the "pounds/postage read" flip-flop 178. The "Q" output of this flip-flop 178, through an amplifier 180, energizes the solenoid 90 (see also FIG. 1) to move the pin 88 into the slot 62c in the ounce code disc 62. As previously discussed, when the end of the slot 62c engages the pin, the rotation of the lead screw 46 is stopped. The motor 54 which drives the lead screw draws so little current in the "slow forward" mode that it will not overheat even when stalled indefinitely. However, an overload cutout switch or other automatic means of reducing current to the motor between weighings may be provided if desired.

The "Q" output of the flip-flop 178 is also connected through a time delay 182 to the gates G of each of six decoders 184 which are respectively connected between the phototransistors 86 and 94 (see also FIG. 3), which sense the "pound" code holes 84a and the "dollars" and "cents" code holes 96a, and the seven-segment numerical display tubes 181, 183 and 185 which respectively display the weight in pounds and the postage in dollars and cents. The time delay 182 delays the reading until the lead screw 46 and the carriage 44 have been brought to a stop by engagement of the end of the slot 62c (FIGS. 1 and 2) with the pin 88, at which time the phototransistors 86 are at the read position opposite the next pound code formed by the holes 84a. Even though to reach this point the carriage 44 may have to travel beyond the balance point a distance corresponding to almost a full pound of weight, it always arrives there before the lower photocell 78 is activated, which occurs at an imbalance of approximately 1½ pounds on the low side. The free movement of the balance beam throughout a range of about 1½ pounds on the high side of the balance point preserves the sensitivity of the scale.

Thus the operation of determining the weight of the parcel and the postage for the selected mode of shipment and distance zone will be completed rapidly and accurately.

When the parcel is thereafter lifted off the platform 10, the balance beam will immediately drop against the lower stop 38 (assuming the parcel weighed at least about 1½ pounds), thereby activating the lower phototransistor 78. As shown in FIG. 6, this phototransistor 78 sends a positive signal through a time delay 188 to the gate G of a "fast reverse" silicon controlled rectifier 186 which energizes the winding of the relay 140. This opens the normally closed contacts 140a and 140b of the relay 140 and closes its normally open contacts 140c and 140d, applying the full supply voltage with reversed polarity to the field winding 54a of the motor 54, causing the motor to drive the lead screw 46 at a fast speed in the reverse direction, moving the carriage 44 and poise 42 quickly back toward the "no load" balance position. As the poise approaches this position (for example, within 1½ pounds of the balance point) the balance beam 32 will move up off the lower stop 38, deactivating the lower phototransistor 78. However, the time delay 188 will keep the motor 54 running in the "fast reverse" mode for a sufficient time for the balance beam 32 to move from the lower stop up past the balance point, after which the positive signal is removed from the gate G of the SCR 186, deenergizing the relay 140, and restoring the motor 54 to its normal "slow forward" mode. This brings the poise 42 slowly back to the balance position, with the ounce readout, the stopping of the lead screw and and the pound/postage readout taking place exactly as described above, except that now all of the readouts will be zero.

The output of the time delay 188 is also connected to the reset terminal R of the "pounds/postage read" flip-flop 178 and each of the "ounces read" flip-flops 162 so that during the time the motor 54 is operating in the "fast reverse" mode all of the "read" phototransistors are inactivated and the solenoid 90 is deenergized and the pin 88 is out of engagement with the slot 62c in the ounce code disc 62.

If it is desired to reweigh an article without removing it from the platform 10, or to weigh a load which is too light to move the balance beam from a lower imbalance position up above the balance point, a manually operable "reweigh" pushbutton 190 (FIG. 6) is depressed. This normally open switch 190 is connected in parallel with the lower phototransistor 78 and its closure likewise causes a positive pulse to be sent through the time delay 188 to reset the flip-flops 178 and 162, inactivating the "read" phototransistor and unlocking the ounce code disc 62. It also sends a positive pulse through the time delay 188 to the "fast reverse" SCR 186, energizing the motor 54 in the "fast reverse" mode for a sufficient time to bring the balance beam well above the balance position, whereupon delayed deenergization of the SCR 186 by the time delay 188 allows the motor 54 to revert to its normal "slow forward" mode to bring the balance beam back to the balance point and initiate the readout operation as described above.

GENERAL DISCUSSION

From the foregoing description, it will be apparent that the present invention provides a scale which accomplishes all of the aforementioned objectives.

The scale, being of the platform balance type, is inherently much more accurate than other types, such as the spring balance and pendulum types. However, since the ounce readings are made while the balance beam 32 is still moving and the pound and postage readings are made at the nest integral pound level after the beam has passed the balance point in the same continuous movement, without waiting for the beam to stop oscillating, the readings are made much more rapidly than in conventional platform balance scales. The operation of the poise drive motor 54 in the "fast forward" mode until the balance beam is within 4 pounds of the balance point substantially enhances the speed of the balancing operation, while the free movement of the balance beam between the ends of the springs 40 (within a range of 1½ pounds of the balance point) preserves the sensitivity of the scale. The speed of measurement also depends upon the inertia of the system, which should be kept to the practical minimum, with the active length of the beam being correspondingly increased, while preserving a substantially linear ratio between the beam displacement and the weight imbalance across the entire weight range.

Another advantage of the system is that the weight readings are always made while the poise is driven in the same direction, thus eliminating any errors due to mechanical backlash.

The poise is preferably provided with rollers riding on the balance beam to minimize friction between them. Friction may be further reduced by a small electric vibrator which is turned on automatically during the "slow forward" mode of operation of the poise drive motor 54 to transmit a minute vibration to the pivots and the poise rollers.

The arms 50 on the carriage 44 which engage the rollers 52 on the poise 42 should of course engage the opposite sides of the rollers as closely as possible to prevent mechanical shock due to the rollers 52 striking the forward arms 50 after stoppage of the carriage on continued inertial movement of the poise 42. To eliminate the need for such close tolerance, the system is preferably designed so that in the balance position, the balance beam is inclined upwardly above the horizontal toward its free end so that gravity will keep the roller 46 is engagement with the rear arm 50.

The basic design is susceptible of many other possible alternatives and modifications. For example, while in the illustrative embodiment shown and described, there are eight numerical display tubes for simultaneous readouts of both weight and postage, it will be apparent that only four tubes, normally connected to display the postage in dollars and cents, need be provided, with switching means to connect them instead to display pounds and ounces, if desired. This would not only reduce cost, but simplify the readout and reduce the possibility of confusion, since in the normal use as a postage scale, the operator is interested only in the postage in dollars and cents and not in the weight in pounds and ounces.

The cost of the unit could be further reduced by substituting a hand crank drive for the rate code roll, with visible indicia to identify the modes of shipment and distance zones.

The digital electronic circuitry inherently provides facilities for various accessories, such as remote repeater readout stations, which are particularly useful in post office applications, so that not only the postal clerk but also the customer outside the cage, might see the correct postage visually displayed. Printout mechanism for making a printed record of the weight and postage, or even a postage meter, can readily be controlled by these digital signals. Likewise a computer can be used to tally the total weights, or postages, or to multiply the measured weights against rates stored in the computer or on punch cards inserted into the computer by the operator according to the desired mode of shipment and distance zone.

A number of other modifications may be made in the illustrative device shown in the drawings without departing from the basic principles of the invention. For example, instead of the combination of lead screw and carriage with internally threaded nut for driving the poise along the balance beam, a suitable alternative would be sprockets and a chain, with arms extending from one of the chain links to engage the rollers on the poise.

Moreover, instead of using four-bit binary coded holes for each of the weight and postage numerals, seven holes, one for each segment of a seven-segment display bulb, could be used, thereby eliminating the need for decoders. Or, instead of determining the position of the poise by a coded pound plate and a coded ounces disc, it could be determined by a pulse generator, for example in the form of a phototransistor such as 82 cooperating with ounce holes, such as 62b, in a disc such as 62, and a pulse counter, with a sixteen-to-one countdown circuit to determine the pounds, and a decoder and digital readout to visually display the weight.

Thus it it should be emphasized that the particular embodiment of the invention shown in the drawings is only illustrative of the principles of the invention and in no way is restrictive of its scope.

I claim:

1. A digital readout scale comprising a vertically movable platform for supporting a load to be weighed, a pivoted balance beam linked to said platform for pivotal movement in a vertical plane in response to the vertical movement of said platform; a poise movable longitudinally of said balance beam for balancing the weight of said load; drive means supported for longitudinal movement along a path extending generally parallel to said balance beam; an electrical motor coupled to said drive means for driving the same in either direction along said path, said drive means engaging said poise to move said poise along said balance beam without substantially impeding pivotal movement of said balance beam through a limited angle above and below a balance position; upper and lower stops positioned to engage said balance beam and limit its range of pivotal movement; upper, lower and balance sensing means for respectively sensing the position of said balance beam when it is against said upper and lower stops and in said balance position, a motor control circuit connected to said electrical motor and including first control means normally energizing said motor to move said drive means to cause relatively slow forward movement of said poise toward the free end of said balance beam, second control means responsive to said upper sensing means to energize said motor to cause relatively fast forward movement of said poise, and third control means responsive to said lower sensing means to energize said motor to cause relatively fast movement of said poise in a reverse direction toward the pivot of said balance beam, timing control means acting upon said first and third control means to stop the fast reverse movement of said poise and restore its normal slow forward movement after an interval sufficient for said balance beam to move from said lower stop upwardly past said balance point after said balance beam has passed below said balance point; digital position indicating means controlled by said balance sensing means for indicating the position of said drive means; and digital readout means controlled by said position indicating means for visibly displaying numerals indicative of the weight of said load.

2. A digital readout scale as described in claim 1 wherein said position indicating means comprises digital code means corresponding to graduated units of weight and code sensing means cooperable with said digital code means, said digital code means and said code sensing means being relatively movable in response to the longitudinal position of said drive means.

3. A digital readout scale as described in claim 2 wherein said digital code means includes an ounce code member coupled to said drive means for rotation thereby through one revolution for each pound of weight of said load, said ounce code member bearing digital ounce codes respectively representing zero through 15 ounces spaced circumferentially around it at intervals of one-sixteenth of a revolution; first detector means for sensing said ounce codes; a pound code member mounted alongside and parallel to the path of said drive means, said pound code member bearing digital pound codes spaced along it at intervals corresponding to the extent of linear movement of said drive means for each pound of weight of said load; and second detector means mounted on said drive means and cooperating with said pound code member for sensing said pound codes.

4. A digital readout scale as described in claim 3 which includes stop means for stopping the movement of said poise when it reaches the point representing the next integral pound of weight of said load after said balance beam has passed said balance point, and timing control means for actuating said second means to sense the pound code at said point after said stop means has stopped the movement of said poise.

5. A digital readout scale as described in claim 4 wherein said stop means comprises a pin engaging an opening in said ounce code member, said pin being actuated by a solenoid energized under the control of said control circuit.

6. A digital readout circuit as described in claim 5 wherein said first detector means is mounted for arcuate movement about an axis coincident with the axis of rotation of said ounce code member to permit calibration of said scale, and wherein said opening in said disc is concentrically arcuate to permit said pin to enter said opening at various times depending upon the adjusted angular position of said first detector means.

7. A digital readout postage scale comprising a vertically movable platform for supporting a load to be weighed, a pivoted balance beam linked to said platform for pivotal movement in a vertical plane in response to the vertical movement of said platform; a poise movable longitudinally of said balance beam for balancing the weight of said load; drive means supported for longitudinal movement along a path extending generally parallel to said balance beam; an electrical motor coupled to said drive means for longitudinal movement thereof in either direction along said path; said drive means engaging said poise to move said poise along said balance beam without substantially impeding pivotal movement of said balance beam through a limited angle; upper and lower stops positioned to engage said balance beam and limit its range of vertical movement above and below a balance position; upper, lower and balance sensing means for respectively sensing the position of said balance beam when it is against said upper and lower stops and in said balance position; a motor control circuit connected to said electrical motor and including first control means normally energizing said motor to move said drive means to cause relatively slow forward movement of said poise toward the free end of said balance beam, second control means responsive to said upper sensing means to energize said motor to cause relatively fast forward movement of said poise, third control means responsive to said lower sensing means to energize said motor to cause relatively fast movement of said poise in a reverse direction toward the pivot of said balance beam, timing control means acting upon said first and third control means to stop the fast reverse movement of said poise and restore its normal slow forward movement after an interval sufficient for said balance beam to move from said lower stop upwardly past said balance point, and fourth control means responsive to said balance sensing means to stop the movement of said drive means; photosensitive detector means movable in response to the movement of said drive means; a postage code member mounted alongside and parallel to the path of movement of said photosensitive detector means and bearing a plurality of sets of visible digital postage codes representing different modes of shipment and distance zones, each of said sets comprising a group of postage codes spaced along said member at intervals corresponding to units of weight, and said postage code member being laterally shiftable to present a selected set of postage codes for cooperation with said photosensitive detector means according to the mode of shipment and distance zone; a reader control circuit responsive to said balance sensing means for actuating said photosensitive detector means after said balance beam reaches said balance point, said reader control circuit including code sensor disabling means responsive to said third control means for disabling said code sensing means during rapid reverse movement of said poise along said balance beam; decoder means for converting said digital codes into electrical signals for actuating a numerical readout; and readout means converted to said decoder for visibly displaying said numerical readout.

8. A digital readout postage scale as described in claim 7 wherein said postage code member comprises a sheet whose opposite end portions are respectively rolled on a pair of drums rotatably mounted on a base member which is removably supported in said scale.

9. A digital readout postage scale as described in claim 8 which also includes a second electrical motor coupled to one of said drums for causing linear movement of said sheet to bring a selected set of postage codes into operative position in a flat span of said sheet between said drums for cooperation with said photosensitive detector means, and manually operable switch means for controlling said second motor.

10. A digital readout postage scale as described in claim 9 wherein said manually operable switch means includes a plurality of keys respectively corresponding to different types of shipment and different distance zones, and wherein said sheet includes coded indicia identifying said types of shipment and distance zones, and wherein said postage scale also includes sensing means for sensing said indicia, and a motor control circuit responsive to said sensing means for controlling said second motor, whereby actuation of said keys will energize said second motor to drive said sheet, and the arrival at said operative position of the set of postage codes corresponding to the selected mode of shipment and distance zone will shut off said second motor.

11. A digital readout postage scale comprising a vertically movable platform for supporting a load to be weighed, a pivoted balance beam linked to said platform for pivotal movement in a vertical plane in response to the vertical movement of said platform; a poise movable longitudinally of said balance beam for balancing the weight of said load, a lead screw generally parallel to said balance beam for rotation on its longitudinal axis, an electrical motor coupled to said lead screw for axial rotation thereof, a carriage in threaded engagement with said lead screw for movement along said lead screw by axial rotation of said lead screw; arm means extending from said carriage and engaging said poise to move said poise along said balance beam, said arm means extending perpendicularly to a radial line extending from the pivot of said balance beam to permit substantially unimpeded pivotal movement of said balance beam through a limited angle; upper and lower stops positioned to engage said balance beam and limit its range of vertical movement above and below a balance position; upper, lower and balance sensing means for respectively sensing the position of said balance beam when it is against said upper and lower stops and in said balance position; a motor control circuit connected to said electrical motor and including first control means normally energizing said motor to drive said lead screw to cause relatively slow forward movement of said poise toward the free end of said balance beam, second control means responsive to said upper sensing means to energize said motor to cause relatively fast forward movement of said poise, third control means responsive to said lower sensing means to energize said motor to cause relatively fast movement of said poise in a reverse direction toward the pivot of said balance beam, timing control means acting upon said first and third control means to stop the fast reverse movement of said poise and restore its normal slow forward movement after an interval sufficient for said balance beam to move past said balance point, and fourth control means responsive to said balance sensing means to stop the rotation of said lead screw; an ounce code member coupled to said lead screw for rotation thereby through one revolution for each pound of weight of said load, said ounce code member bearing digital ounce codes respectively representing zero through 15 ounces spaced circumferentially around it at intervals of one-sixteenth of a revolution; first photosensitive detector means for sensing said ounce codes; a pound code member mounted alongside and parallel to said lead screw, said pound code member bearing digital pound codes spaced along it at intervals corresponding to the extent of linear movement of said carriage for each pound of weight of said load; second photosensitive detector means movable with said poise and cooperable with said pound code member for sensing said pound codes; a postage code member mounted alongside and parallel to said lead screw; a time delay circuit interposed between said reader control circuit and said second photosensitive detector means whereby said second photosensitive means is not actuated to sense the pound code at said point until said stop means has stopped the movement of said poise, said postage code member being shiftable in a plane parallel to said lead screw to present a selected set of postage codes for cooperation with said photosensitive detector means according to the mode of shipment; third photosensitive detector means movable with said carriage and cooperable with said postage code member for sensing the selected set of postage codes; a reader control circuit responsive to said balance sensing means for actuating all said photosensitive detector means after said balance beam reaches said balance point; said reader control circuit including means for disabling said code sensing means during rapid reverse movement of said poise along said balance beam; decoder means for converting said digital codes into electrical signals for actuating a numerical readout; and readout means connected to said decoder for visibly displaying said numerical readout.

* * * * *